United States Patent
Chustz et al.

(10) Patent No.: US 10,253,820 B2
(45) Date of Patent: Apr. 9, 2019

(54) FULL CONTACT JOINT ASSEMBLY

(71) Applicant: Scientific Drilling International, Inc., Houston, TX (US)

(72) Inventors: Mark Chustz, Porter, TX (US); Jon Meier, Houston, TX (US)

(73) Assignee: SCIENTIFIC DRILLING INTERNATIONAL, INC., Houston, TX (US)

(*) Notice: Subject to any disclaimer, the term of this patent is extended or adjusted under 35 U.S.C. 154(b) by 157 days.

(21) Appl. No.: 15/075,675

(22) Filed: Mar. 21, 2016

(65) Prior Publication Data

US 2016/0290411 A1 Oct. 6, 2016

Related U.S. Application Data

(60) Provisional application No. 62/142,684, filed on Apr. 3, 2015.

(51) Int. Cl.
| | |
|---|---|
| *F16D 3/26* | (2006.01) |
| *F16D 3/205* | (2006.01) |
| *F16D 3/18* | (2006.01) |
| *E21B 4/00* | (2006.01) |
| *E21B 7/06* | (2006.01) |

(52) U.S. Cl.
CPC .............. *F16D 3/205* (2013.01); *E21B 4/006* (2013.01); *E21B 7/068* (2013.01); *F16D 3/185* (2013.01); *F16D 3/2057* (2013.01)

(58) Field of Classification Search
CPC ........ F16D 3/205; F16D 3/185; F16D 3/2057; E21B 7/068; E21B 4/006
USPC ............................ 464/152, 155, 76; 175/320
See application file for complete search history.

(56) References Cited

U.S. PATENT DOCUMENTS

| | | | | |
|---|---|---|---|---|
| 3,257,826 A | * | 6/1966 | Peterson | F16D 3/68 464/76 |
| 3,517,754 A | * | 6/1970 | Hughes | E21B 17/073 |
| 4,610,643 A | * | 9/1986 | Krude | F16D 3/2233 |
| 5,671,816 A | * | 9/1997 | Tibbitts | E21B 7/064 464/152 X |
| 6,098,726 A | * | 8/2000 | Taylor | E21B 17/076 464/76 |
| 8,900,062 B2 | * | 12/2014 | Nicol-Seto | E21B 17/03 464/155 X |
| 8,915,788 B2 | * | 12/2014 | Foote | F16D 3/24 464/152 X |

OTHER PUBLICATIONS

"Basic Requirements for Constant Velocity (CV) Universal Joints" Universal Joint and Driveshaft Design Manual, AE-7, Society of Automotive Engineers Inc., Warrendale, PA,TJ1079.S62 1979.*

* cited by examiner

*Primary Examiner* — Greg Binda
(74) *Attorney, Agent, or Firm* — Adolph Locklar

(57) ABSTRACT

A joint for a BHA includes an inner driven rod, an outer drive coupling, and a thrust plate. The inner driven rod includes at least one lobe extending radially therefrom. The outer drive coupling includes a keyway formed therein corresponding to and adapted to receive each lobe. A thrust plate is positioned between at least one side of each lobe and the corresponding keyway. The thrust plate may allow for the reduction of point or line stress loading on the lobe and keyway.

15 Claims, 5 Drawing Sheets

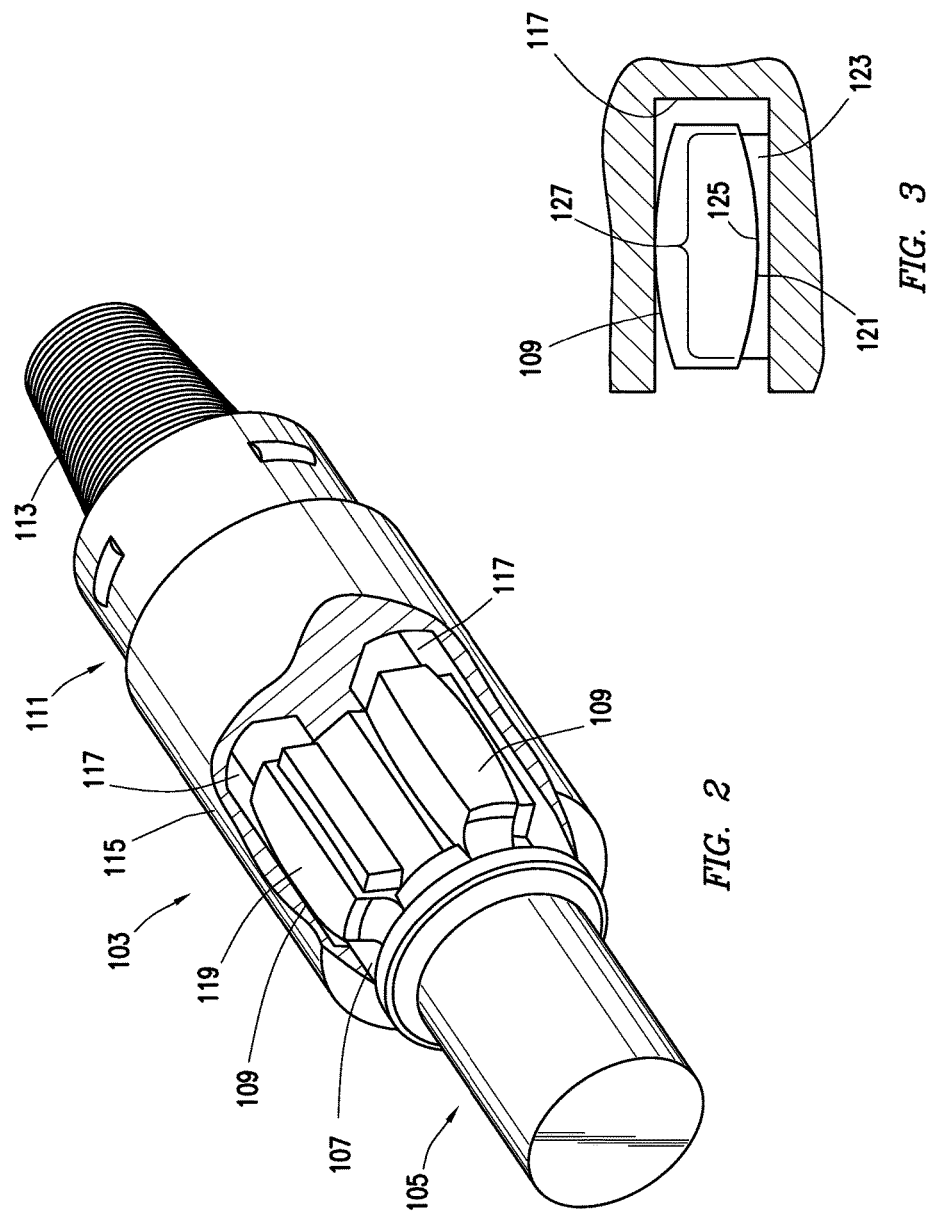

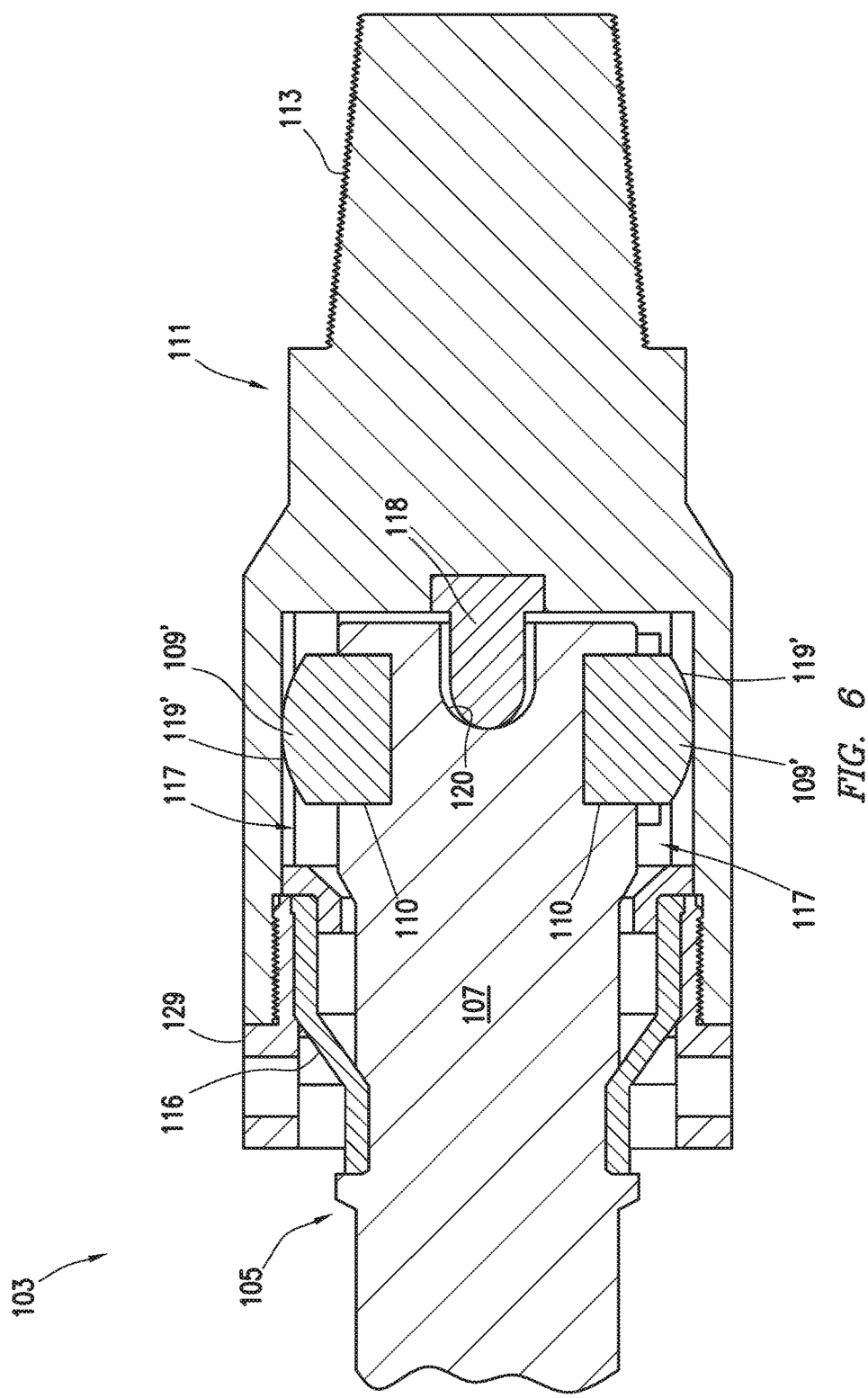

FULL CONTACT JOINT ASSEMBLY

CROSS-REFERENCE TO RELATED APPLICATIONS

This application is a nonprovisional application which claims priority from U.S. provisional application No. 62/142,684, filed Apr. 3, 2015.

TECHNICAL FIELD/FIELD OF THE DISCLOSURE

The present disclosure relates generally to power transmission, and specifically to joints.

BACKGROUND OF THE DISCLOSURE

In a drill string, the drill bit may be turned by a mud motor, especially when directional drilling using a rotary steerable system (RSS). Mud motors, as understood in the art, often utilize Moineau or progressive cavity pumps. Progressive cavity pumps include a multi-lobed rotor which eccentrically rotates within a correspondingly lobed stator. In order to mechanically couple the eccentrically rotating rotor to a concentrically rotating drive shaft, a transmission assembly may be utilized. In some cases, a flexible shaft, known as a flexshaft, may be utilized. In other cases, a rigid transmission shaft which is mechanically coupled to the rotor and drive shaft by one or more joints may be utilized. However, typical joints create point or line stress loading forces therein, contributing to wear and excessive stresses on the drives.

SUMMARY

The present disclosure provides for a full contact joint. The full contact joint may include an inner driven rod. The inner driven rod may have at least one lobe extending radially therefrom. The full contact joint may include an outer drive coupling. The outer drive coupling may have a keyway formed therein corresponding to and adapted to receive each lobe. The full contact joint may include a thrust plate positioned between at least one side of each lobe and the corresponding keyway.

The present disclosure also provides for a transmission assembly for coupling between a mud motor and a drive shaft in a bottom hole assembly. The transmission assembly may include a transmission shaft and a first and second full contact joint. The first full contact joint may mechanically couple between a rotor of the mud motor and the transmission shaft. The second full contact joint may mechanically couple between the transmission shaft and the drive shaft. Each full contact joint may include an inner driven rod. The inner driven rod may have at least one lobe extending radially therefrom. The full contact joint may include an outer drive coupling. The outer drive coupling may have a keyway formed therein corresponding to and adapted to receive each lobe. The full contact joint may include a thrust plate positioned between at least one side of each lobe and the corresponding keyway.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIG. 2 depicts a cutaway view of a joint consistent with at least one embodiment of the present disclosure.

FIG. 3 depicts a partial cross section view of the joint of FIG. 2.

FIG. 6 depicts a cross section view of the joint of FIG. 4.

DETAILED DESCRIPTION

Figure 1:
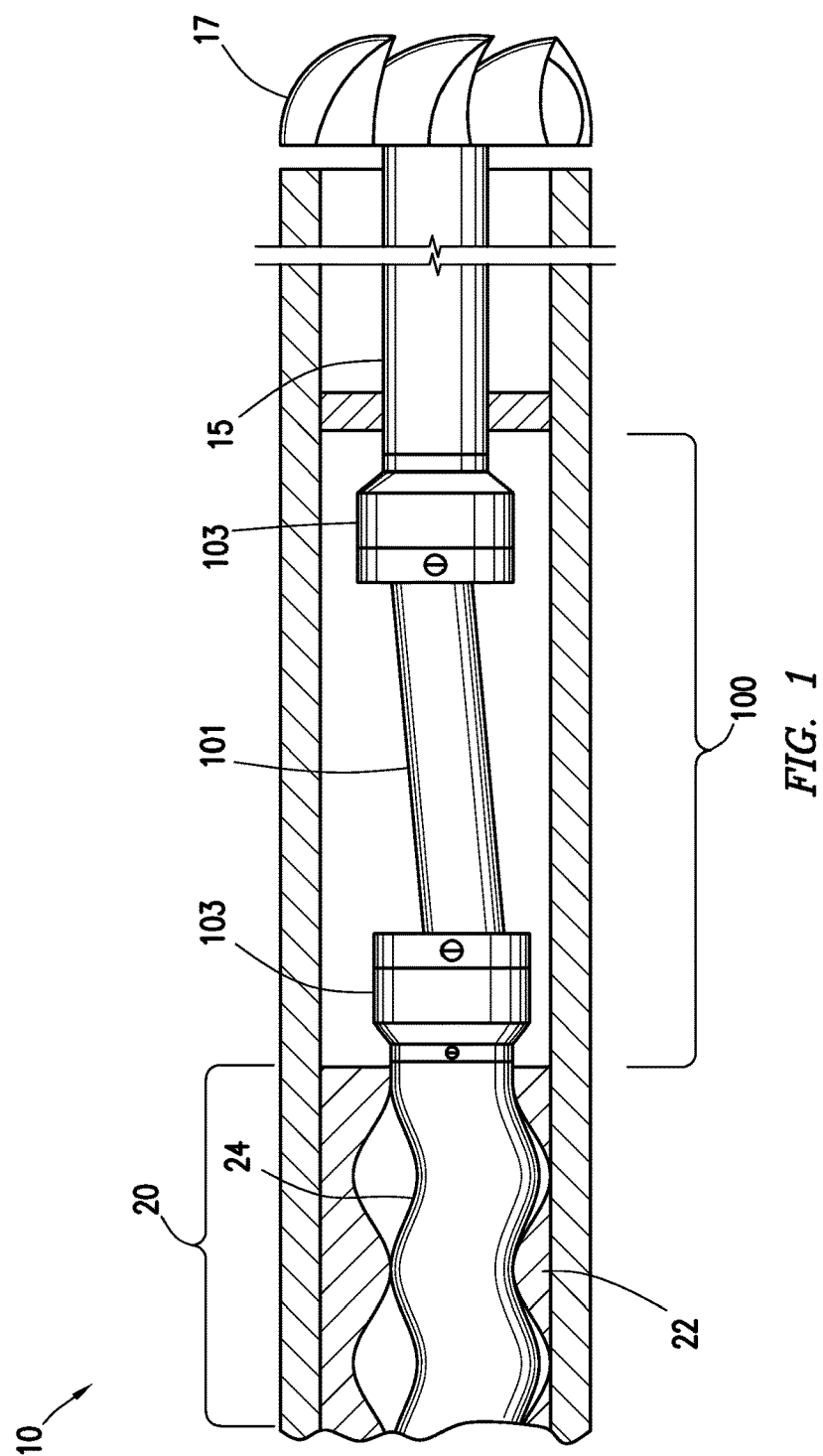
FIG. 1 depicts a schematic view of a bottom hole assembly utilizing a driveshaft consistent with at least one embodiment of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

As depicted in FIG. 1, bottom hole assembly (BHA) 10 may include mud motor 20. Mud motor 20 may utilize a progressive cavity power section. Mud motor 20 may include stator 22 and rotor 24. Rotor 24 may eccentrically rotate in response to the flow of a fluid such as drilling fluid through stator 22. BHA 10 may further include bearing shaft 15. Bearing shaft 15 may be mechanically coupled to bit 17. Bearing shaft 15 may be mechanically coupled to rotor 24 by transmission assembly 100.

Transmission assembly 100 may include transmission shaft 101. In some embodiments, transmission shaft 101 may be mechanically coupled to one or both of rotor 24 and bearing shaft 15 by full contact joint 103. Full contact joint 103 may transmit rotation from eccentrically rotating rotor 24 to concentrically rotating driveshaft 15, while allowing 2 degrees of freedom of movement between transmission shaft 101 and full contact joint 103.

Figure 4:
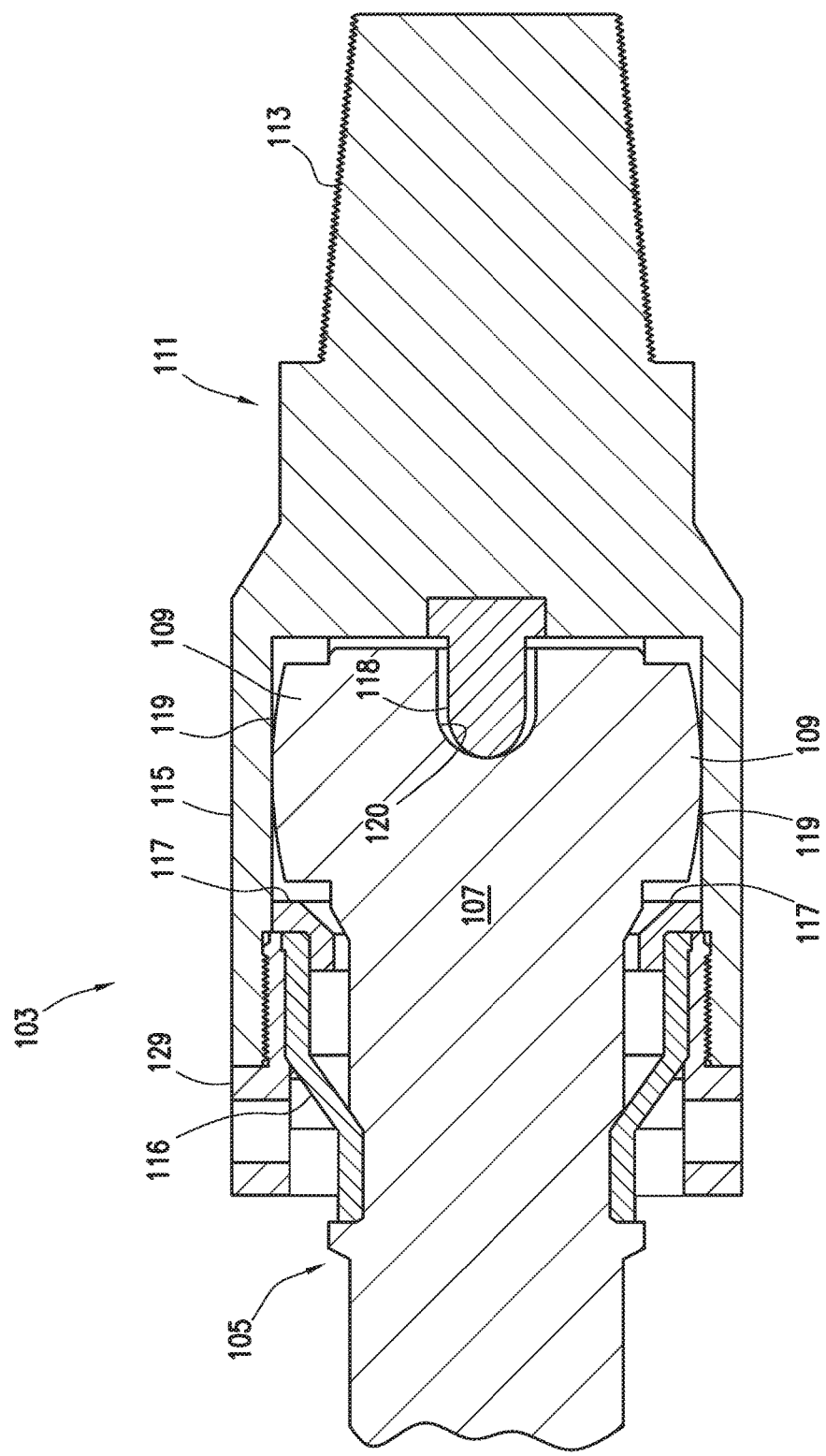
FIG. 4 depicts a cross section view of the joint of FIG. 2.

In some embodiments, full contact joint 103 may be a sealed driver as understood in the art. As depicted in FIGS. 2-4, full contact joint 103 may include inner driven rod 105. Inner driven rod 105 may be mechanically coupled to or formed as an end of transmission shaft 101. In some embodiments, inner driven rod 105 may include driven rod body 107. In some embodiments, driven rod body 107 may be a generally cylindrical or tubular member. In some embodiments, driven rod body 107 may be formed as a part of the end of transmission shaft 101. In some embodiments, driven rod body 107 may be mechanically coupled to an end of transmission shaft 101. In some embodiments, inner driven rod 105 may include one or more lobes 109. Lobes 109 may protrude radially from the exterior surface of driven rod body 107. Lobes 109 may be positioned radially about the exterior of driven rod body 107. In some embodiments, lobes 109 may be formed integrally with driven rod body 107. In some embodiments, for example and without limitation, lobes 109 may be formed by milling, turning, or otherwise machining driven rod body 107. In some embodiments, lobes 109 may be formed separately from driven rod body 107. In some embodiments, lobes 109 may be mechanically coupled to driven rod body 107 by, for example and without limitation, mechanical welding.

In some embodiments, lobes 109 may be removable from driven rod body 107. For example, as depicted in FIG. 6, lobes 109' may be formed separately from driven rod body 107. In some such embodiments, driven rod body 107 may include recesses 110 positioned to receive lobes 109'. Recesses 110 may be generally smooth to allow lobes 109' to be inserted thereinto. In some embodiments, recesses 110 may include one or more coupling features including, for example and without limitation, threads, dovetails, or other fasteners.

In some embodiments, full contact joint 103 may further include outer drive coupling 111. Outer drive coupling 111 may include coupling 113 adapted to mechanically couple to rotor 24 or driveshaft 15 as previously discussed. In some embodiments, coupling 113 may include a threaded coupler such as a pin or box for a box and pin joint. One having ordinary skill in the art with the benefit of this disclosure will understand that coupling 113 may mechanically couple to rotor 24 or driveshaft 15 using any known interface without deviating from the scope of this disclosure.

Outer drive coupling 111 may further include joint housing 115. Joint housing 115 may be generally tubular in shape including an inner cavity adapted to receive at least part of inner driven rod 105. In some embodiments, as depicted in FIG. 4, full contact joint 103 may further include boot 116 adapted to mechanically couple between driven rod body 107 and joint housing 115 to, for example and without limitation, seal the interior of full contact joint 103. Boot 116 may further contain a lubricant such as grease and inhibit ingress of any contaminates into the interior of full contact joint 103.

In some embodiments, full contact joint 103 may include a thrust transfer feature positioned to transfer longitudinal force between outer drive coupling 111 and inner driven rod 105 while allowing inner driven rod 105 to pivot relative to outer drive coupling 111. In some embodiments, the thrust transfer feature may be, for example and without limitation, thrust post 118. Thrust post 118 may include a generally hemispherical end adapted to fit within thrust post receiver 120 formed in driven rod body 107.

In some embodiments, as depicted in FIGS. 2-4, joint housing 115 may include one or more keyways 117. Keyways 117 are formed to correspond with the number, geometry, and arrangement of lobes 109 of inner driven rod 105. In some embodiments, keyways 117 may be generally rectangular in cross section. Keyways 117 may be adapted to transfer torsional loading from outer drive coupling 111 to inner driven rod 105 through lobes 109. Likewise, keyways 117 may be adapted to receive torsional loading from driven rod 105 through lobes 109. In some embodiments, full contact joint 103 may be adapted to or be optimized to transfer torsional loading in a single direction. Keyways 117 may be formed by any manufacturing process known in the art, including, for example and without limitation, milling, turning, reaming, or wire EDM.

In some embodiments, as depicted in FIGS. 2-4, lobes 109 may be generally box shaped. As depicted in FIG. 4, each lobe 109 may include curved top profile 119. Curved top profile 119 may be adapted to fit within the corresponding keyway 117 and allow substantially continuous contact between at least a portion of lobe 109 and joint housing 115 as driven rod body 107 pivots relative to outer drive coupling 111 in a plane aligned with the lobe 109 and keyway 117.

In some embodiments, as depicted in FIGS. 2, 3, each lobe 109 may include curved side profiles 121. In some embodiments, outer drive coupling 111 may further include thrust plate 123. Thrust plate 123 may be positioned between one or both curved side profiles 121 and keyway 117. In some embodiments, thrust plate 123 may be positioned between each lobe 109 and keyway 117 on the side of lobe 109 corresponding with the torsional loading resulting from torsional load in a desired direction. In some embodiments, curved side profiles 121 may be adapted to fit within the corresponding keyway 17 and allow continuous contact between at least a portion of lobe 109 and joint housing 115 as driven rod body 107 pivots relative to outer drive coupling 111 in a plane transverse to lobe 109 and keyway 117.

Figure 5:
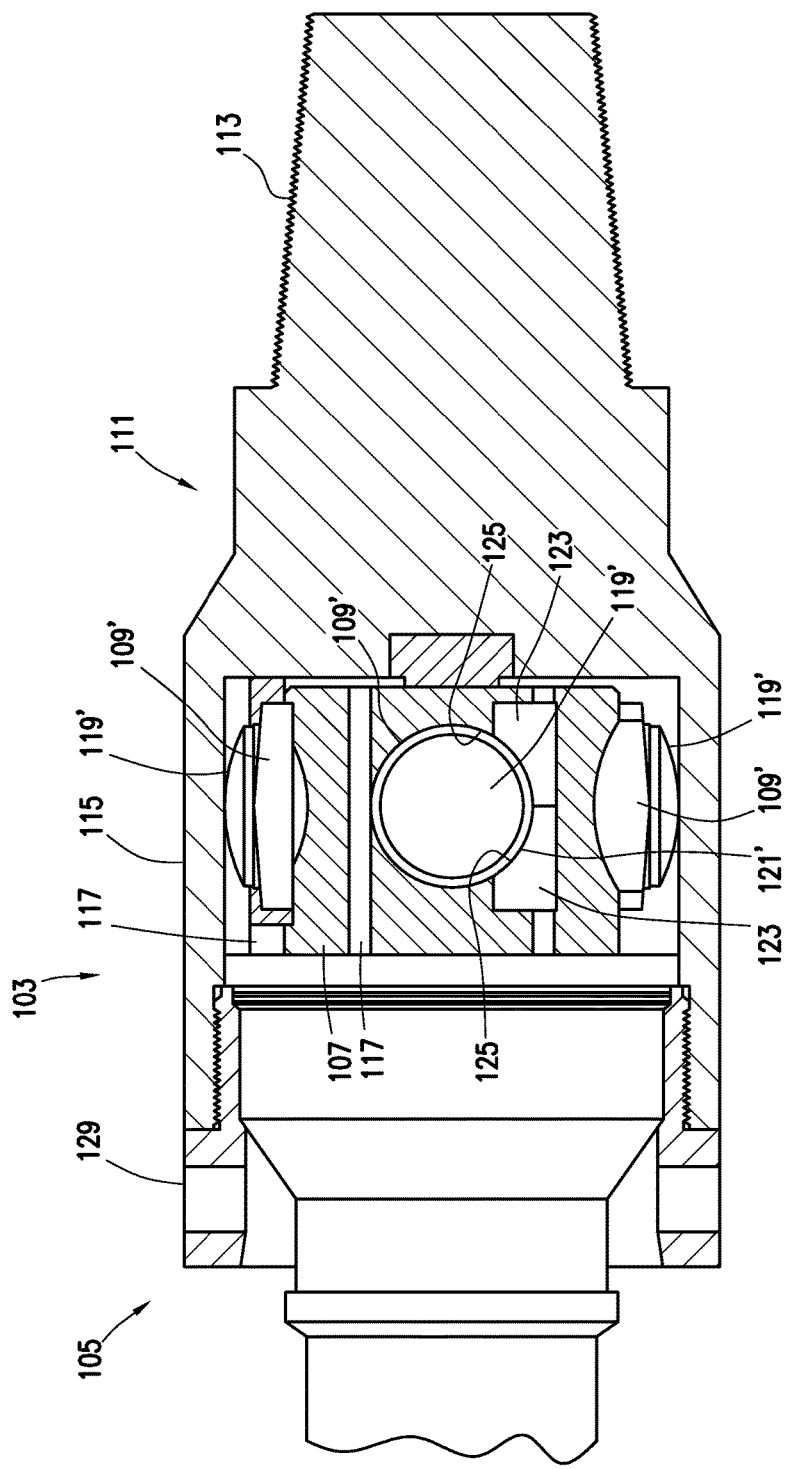
FIG. 5 depicts a cutaway view of a joint consistent with at least one embodiment of the present disclosure.

In some embodiments, as depicted in FIGS. 5, 6, lobes 109' may be generally round in shape. In some embodiments, each lobe 109' may include curved top profile 119'. Curved top profile 119' may be adapted to fit within the corresponding keyway 117 and allow continuous contact between at least a portion of lobe 109' and joint housing 115 as driven rod body 107 pivots relative to outer drive coupling 111 in a plane aligned with the lobe 109' and keyway 117.

In some embodiments, as depicted in FIG. 5, each lobe 109' may include curved side profiles 121'. Thrust plate 123 may be positioned between one or both curved side profiles 121' and keyway 117. In some embodiments, thrust plate 123 may be positioned between each lobe 109' and keyway 117 on the side of lobe 109' corresponding with the torsional loading resulting from torsional load in a desired direction. In some embodiments, curved side profiles 121' may be adapted to fit within the corresponding keyway 117 and allow continuous contact between at least a portion of lobe 109' and joint housing 115 as driven rod body 107 pivots relative to outer drive coupling 111 in a plane transverse to lobe 109' and keyway 117.

In some embodiments, as depicted in FIGS. 3, 5 thrust plate 123 may include curved side profile 125 adapted to correspond to curved side profile 121 of lobe 109, 109'. In some embodiments, thrust plate 123 may thus allow for full contact between lobe 109, 109' and thrust plate 123 as driven rod body 107 pivots relative to outer drive coupling 111 in a plane transverse to lobe 109, 109' and keyway 117. The full contact, indicated as contact patch 127, may, for example and without limitation, more evenly distribute the torsional loading between lobe 109, 109' and keyway 17 across the surface of lobe 109, 109' and keyway 17.

In some embodiments, thrust plate 123 may be formed from a material generally harder than lobe 109, 109' to, for example and without limitation, prevent wear of thrust plate 123 as lobe 109, 109' pivots relative thereto. In some embodiments, thrust plate 123 may be formed from a material generally softer than lobe 109, 109' to, for example and without limitation, undergo greater wear than lobe 109, 109' or keyway 117. In such an embodiment, thrust plate 123 may be a consumable and replaceable part.

In some embodiments, thrust plate 123 may be formed as a single unit as depicted in FIG. 3. In some embodiments, thrust plate 123 may be formed from multiple units as depicted in FIG. 5.

In some embodiments, as depicted in FIGS. 4, 6, full contact joint 103 may further include end sub 129. End sub 129 may be generally annular in shape. End sub 129 may be positioned about inner driven rod 105 and mechanically couple to joint housing 115. In some embodiments, end sub 129 may be positioned to retain inner driven rod 105 within joint housing 115. In some embodiments, end sub 129 may also be positioned to retain boot 116 within joint housing 115.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

The invention claimed is:

1. A full contact joint comprising:
    an inner driven rod, the inner driven rod having at least one lobe extending radially therefrom;
    an outer drive coupling, the outer drive coupling having a keyway formed therein corresponding to and adapted to receive each lobe; and
    a thrust plate positioned between at least one side of each lobe and the corresponding keyway, each lobe in direct contact with the corresponding keyway on a side of the lobe opposite the thrust plate;
    wherein the thrust plate is formed from a material that is softer than that of the at least one lobe.

2. The full contact joint of claim 1, wherein each lobe is generally box shaped, each lobe having a curved top profile and first and second curved side profile, the curved top profile and the first curved side profile adapted to remain in continuous contact with the keyway as the inner driven rod pivots with respect to the outer drive coupling, and the second curved side profile adapted to contact a corresponding curved profile of each thrust plate, such that the thrust plate transfers loading between the lobe and the keyway across a portion of the curved side profile.

3. The full contact joint of claim 1, wherein each lobe is generally round, each lobe having a curved top profile and first and second curved side profile, the curved top profile and the first curved side profile adapted to remain in continuous contact with the keyway as the inner driven rod pivots with respect to the outer drive coupling, and the second curved side profile adapted to contact a corresponding curved profile of each thrust plate, such that the thrust plate transfers loading between the lobe and the keyway across a portion of the curved side profile.

4. The full contact joint of claim 1, wherein the inner driven rod further comprises a driven rod body, the driven rod body including recesses, and wherein each lobe is inserted into a recess.

5. The full contact joint of claim 4, wherein the lobe is formed separately from the driven rod body and mechanically coupled thereto.

6. The full contact joint of claim 5, wherein the driven rod body further comprises a recess adapted to receive the lobe.

7. The full contact joint of claim 1, wherein the inner driven rod further comprises a driven rod body, and the lobe is formed from the driven rod body by one or more of milling, turning, or wire EDM.

8. A transmission assembly for coupling between a mud motor and a drive shaft in a bottom hole assembly comprising:
    a transmission shaft; and
    first and second full contact joints, the first full contact joint coupling between a rotor of the mud motor and the transmission shaft, and the second full contact joint coupling between the transmission shaft and the drive shaft, each full contact joint including:
        an inner driven rod, the inner driven rod having at least one lobe extending radially therefrom;
        an outer drive coupling, the outer drive coupling having a keyway formed therein corresponding to and adapted to receive each lobe; and
        a thrust plate positioned between at least one side of each lobe and the corresponding keyway, wherein the thrust plate is formed from a material that is softer than that of the at least one lobe, each lobe in direct contact with the corresponding keyway on a side of the lobe opposite the thrust plate.

9. The transmission assembly of claim 8, wherein the inner driven rod of each full contact joint comprises a driven rod body formed from an end of the transmission shaft.

10. The transmission assembly of claim 9, wherein the lobe is formed from the driven rod body by one or more of milling, turning, or wire EDM.

11. The transmission assembly of claim 9, wherein the lobe is formed separately from the driven rod body and mechanically coupled thereto.

12. The transmission assembly of claim 11, wherein the driven rod body further comprises a recess adapted to receive the lobe.

13. The transmission assembly of claim 8, wherein each lobe is generally box shaped, each lobe having a curved top profile and first and second curved side profile, the curved top profile and the first curved side profile adapted to remain in continuous contact with the keyway as the inner driven rod pivots with respect to the outer drive coupling, and the second curved side profile adapted to contact a corresponding curved profile of each thrust plate, such that the thrust plate transfers loading between the lobe and the keyway across a portion of the curved side profile.

14. The transmission assembly of claim 8, wherein each lobe is generally round, each lobe having a curved top profile and first and second curved side profile, the curved top profile and the first curved side profile adapted to remain in continuous contact with the keyway as the inner driven rod pivots with respect to the outer drive coupling, and the second curved side profile adapted to contact a corresponding curved profile of each thrust plate, such that the thrust plate transfers loading between the lobe and the keyway across a portion of the curved side profile.

15. The transmission assembly of claim 8, wherein each outer drive coupling further comprises a coupling adapted to mechanically couple the full contact joint to one of the drive shaft or the rotor.

* * * * *